(12) United States Patent
Chou

(10) Patent No.: US 8,284,297 B2
(45) Date of Patent: Oct. 9, 2012

(54) CAMERA MODULE WITH PIEZOELECTRIC ACTUATOR

(75) Inventor: Yuan-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 586 days.

(21) Appl. No.: 12/612,064

(22) Filed: Nov. 4, 2009

(65) Prior Publication Data
US 2010/0271541 A1    Oct. 28, 2010

(30) Foreign Application Priority Data
Apr. 27, 2009 (CN) .......................... 2009 1 0301877

(51) Int. Cl.
*G03B 13/00* (2006.01)
*H04N 5/232* (2006.01)
*H04N 5/225* (2006.01)

(52) U.S. Cl. ........................ 348/357; 348/374
(58) Field of Classification Search .................. 348/357
See application file for complete search history.

(56) References Cited

U.S. PATENT DOCUMENTS

| | | | | |
|---|---|---|---|---|
| 5,585,685 | A * | 12/1996 | Maeno et al. | 310/323.02 |
| 7,656,460 | B2 * | 2/2010 | Wernersson | 348/374 |
| 7,773,876 | B2 * | 8/2010 | Westerweck et al. | 396/535 |
| 7,782,560 | B2 * | 8/2010 | Huang et al. | 359/824 |
| 7,983,555 | B2 * | 7/2011 | Lee et al. | 396/533 |
| 2005/0248684 | A1 * | 11/2005 | Machida | 348/373 |
| 2006/0044455 | A1 * | 3/2006 | Kim et al. | 348/360 |
| 2006/0140609 | A1 * | 6/2006 | Chen | 396/85 |
| 2007/0280667 | A1 * | 12/2007 | Shin | 396/133 |
| 2008/0037143 | A1 * | 2/2008 | Yoon | 359/824 |
| 2008/0085110 | A1 * | 4/2008 | Su et al. | 396/133 |
| 2008/0144186 | A1 * | 6/2008 | Feng et al. | 359/666 |
| 2008/0174889 | A1 * | 7/2008 | Su et al. | 359/824 |
| 2009/0251798 | A1 * | 10/2009 | Huang et al. | 359/694 |
| 2011/0075280 | A1 * | 3/2011 | Chou et al. | 359/824 |

* cited by examiner

*Primary Examiner* — Sinh Tran
*Assistant Examiner* — Jason Flohre
(74) *Attorney, Agent, or Firm* — Altis Law Group, Inc.

(57) ABSTRACT

A camera module includes a positioning plate, a positioning frame, a spring member, a lens holder, and a piezoelectric actuator. The positioning frame is fixed to the positioning plate and defines a positioning through hole. The spring member is disposed on the positioning plate and in a compressed state. The lens holder is received in the positioning through hole and movably engaged with the positioning frame. The piezoelectric actuator is sandwiched between the compressed spring member and the lens holder. The piezoelectric actuator is operable to drive the lens holder to rotate about a central axis of the positioning frame, thereby move along the central axis relative to the positioning frame.

19 Claims, 3 Drawing Sheets

CAMERA MODULE WITH PIEZOELECTRIC ACTUATOR

BACKGROUND

1. Technical Field

The present disclosure relates to camera modules and, particularly, to a camera module having a piezoelectric actuator.

2. Description of Related Art

Recent development trends in the field of camera modules focus on low cost and miniaturization. However, to provide focusing functions, current camera modules typically employ stepper motors or voice coil motors (VCMs), which substantially increase the cost and the size of these camera modules.

Therefore, it is desirable to provide a small, inexpensive camera module which has focusing function.

BRIEF DESCRIPTION OF THE DRAWINGS

In the drawings, all the views are schematic.

DETAILED DESCRIPTION

Embodiments of the present disclosure will now be described in detail with reference to the drawings.

Figure 1:
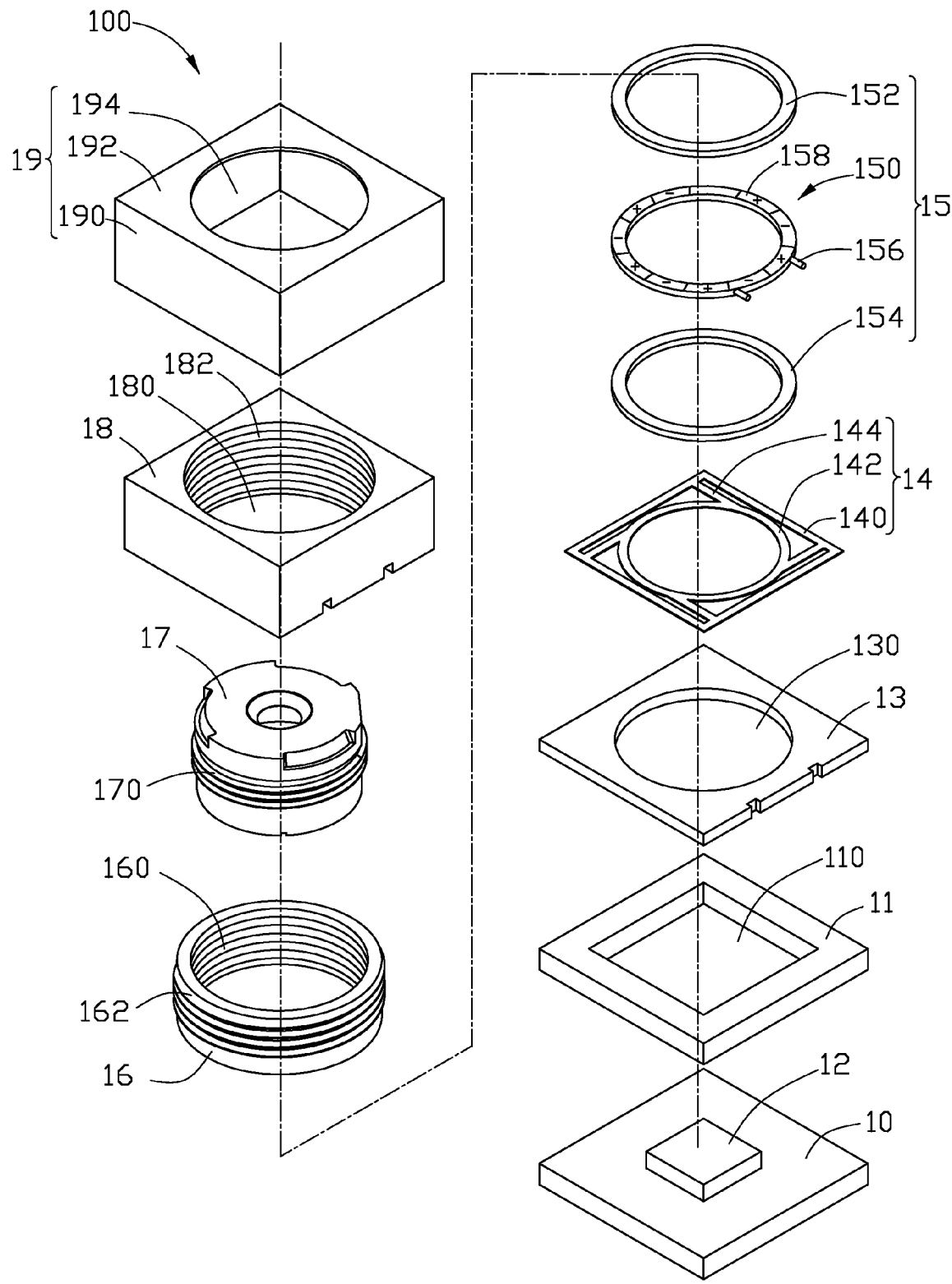
FIG. 1 is an exploded, isometric view of a camera module, according to an exemplary embodiment.

Referring to FIG. 1, a camera module 100, according to an exemplary embodiment, includes a substrate 10, a receiving frame 11, an image sensor 12, a positioning plate 13, a spring member 14, a piezoelectric actuator 15, a lens holder 16, a lens barrel 17, a positioning frame 18, and a cover 19.

The substrate 10 is a rectangular plate. In this embodiment, the substrate 10 is a printed circuit board.

The image sensor 12 is operable to sense incident light and generate electrical signals correspondingly.

The receiving frame 11 is a rectangular plate defining a rectangular opening 110 in the center thereof. The height of the receiving frame 11 is larger than that of the image sensor 12.

The positioning plate 13 is rectangular, and defines a circular receiving through hole 130 in the center thereof.

The spring member 14 includes a rectangular outer portion 140, an annular inner portion 142, and four rectangular connecting portions 144. One end of each connecting portion 143 is perpendicularly connected to a corresponding side of the outer portion 140, and the other end is connected to the inner portion 142. As such, the inner portion 142 is enclosed by the outer portion 140 and held a short distance from the outer portion 140 by the connecting portions 143. The outer diameter of the inner portion 142 is slightly smaller than the diameter of the receiving through hole 130.

The piezoelectric actuator 15 includes a piezoelectric member 150, two protecting members 152, 154, and two electrodes 156. The piezoelectric member 150 and the two protecting members 152, 154 are ring-shaped (annular). The piezoelectric member 150 includes a number of polarized piezoelectric segments 158. In FIG. 1, the symbols "+" and "−" represent opposite polarizing directions of the piezoelectric segments 158. The two electrodes 156 are connected to the piezoelectric segments 158. The piezoelectric member 150 is thus operable to generate a wave travelling around the circumference thereof, when two voltages having a phase difference of ninety degrees are correspondingly applied to the oppositely polarized piezoelectric segments 158 via the two electrodes 156. The two protecting members 152, 154 are elastic and sandwich the piezoelectric member 150 therebetween in order to protect the piezoelectric member 150. In practice, the protecting members 152, 154 are made of a material with a high coefficient of friction, such as rubber. The outer diameters of the piezoelectric member 150 and the two protecting members 152, 154 are substantially equal to the outer diameter of the inner portion 142.

The lens holder 16 is approximately a circular tube in shape. The lens holder 16 defines a first internal screw thread 160 in an inner surface thereof, and a first external screw thread 162 in an outer surface thereof.

The lens barrel 17 is approximately a circular tube in shape, and defines a second external screw thread 170 in an outer surface thereof. The outer diameter of the lens barrel 17 is substantially equal to the inner diameter of the lens holder 16. The lens barrel 17 is structured and arranged to receive lenses.

The positioning frame 18 is approximately a short, rectangular tube in shape, and defines a positioning through hole 180 in the center thereof. The positioning frame 18 defines a second internal screw thread 182 in an inner surface thereof which bounds the positioning through hole 180. The diameter of the positioning through hole 180 is substantially equal to the outer diameter of the lens holder 16.

The cover 19 includes a sidewall 190, and an upper plate 192 extending from (or mounted on) the sidewall 190. The cover 19 defines a circular opening 194 in the center of the upper plate 192.

Figure 2:
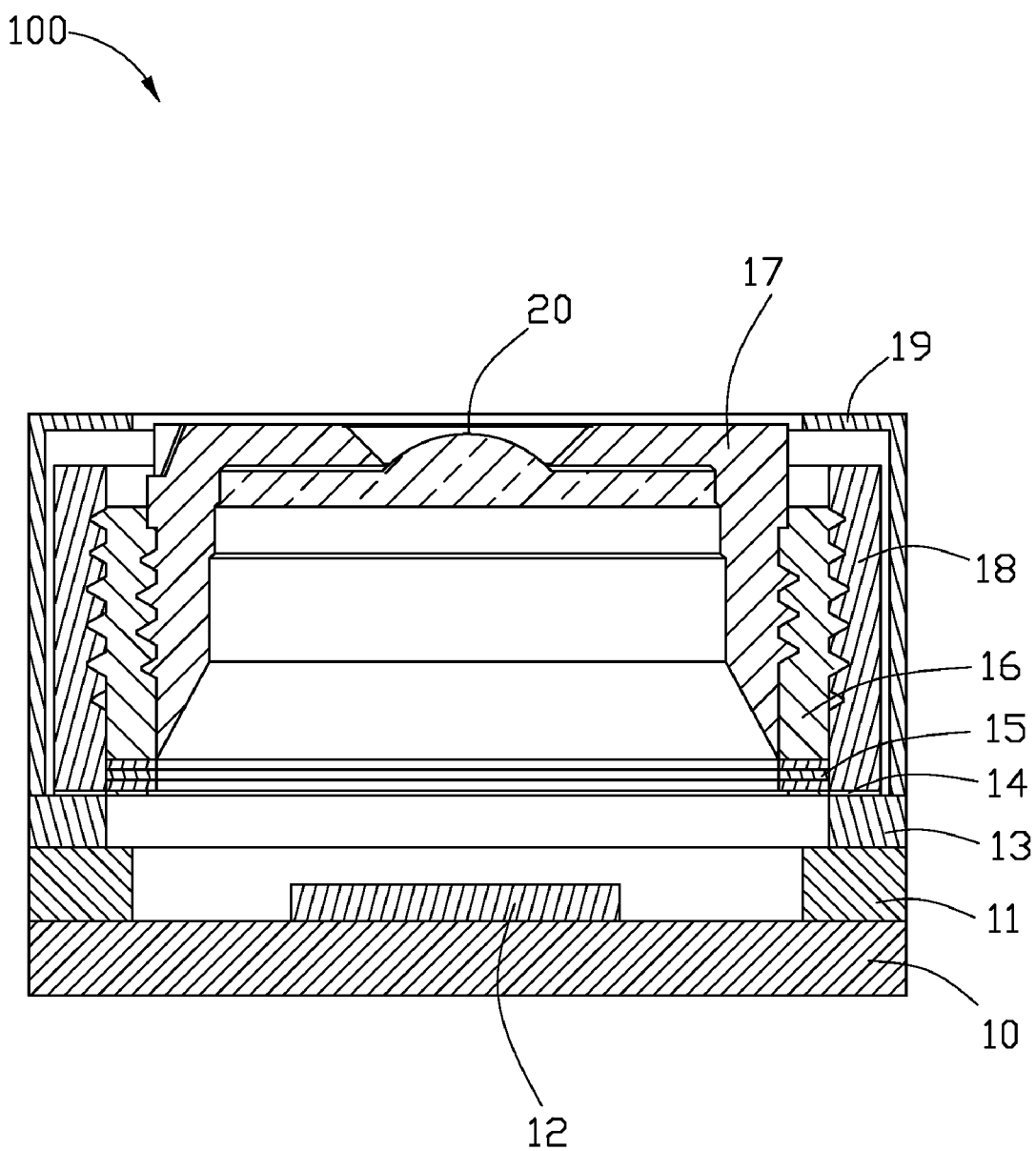
FIG. 2 is an assembled, cross-sectional view of the camera module of FIG. 1.
Figure 3:
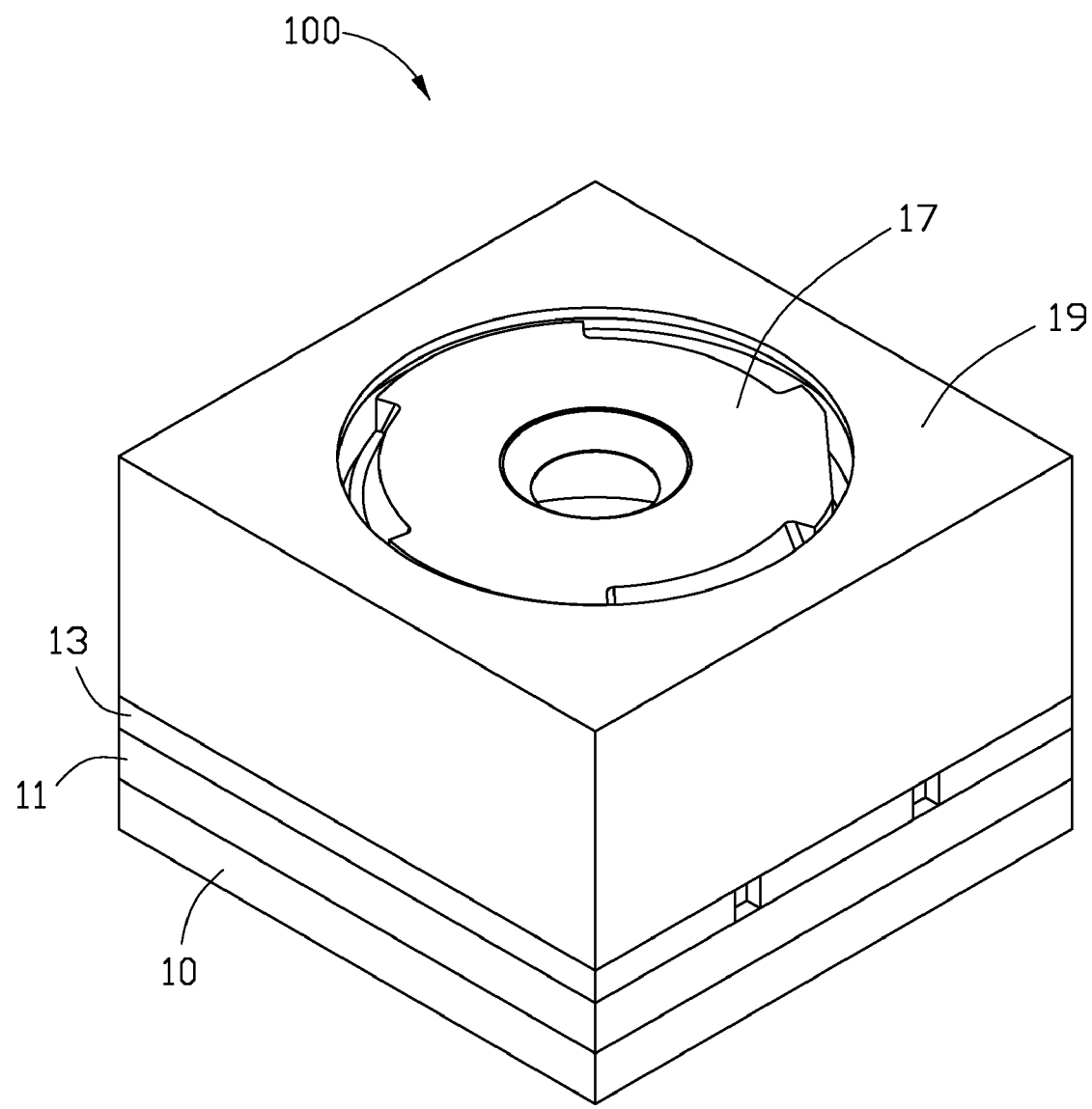
FIG. 3 is an assembled view of the camera module of FIG. 1.

Also referring to FIGS. 2-3, in assembly of the camera module 100, the image sensor 12 is fixed to the center of the substrate 10 and electrically connected to the substrate 10. The receiving frame 11 is also fixed to the substrate 10 and surrounds the image sensor 12. The positioning plate 13 is fixed to the receiving frame 11. The spring member 14 is positioned on the positioning plate 13, with the outer portion 140 in contact with the positioning plate 13, and the inner portion 142 coaxially suspended over the receiving through hole 130. The piezoelectric actuator 15 is fixed to the inner portion 142, and the electrodes 156 are electrically connected to the substrate 10. The positioning frame 18 is fixed to the outer portion 140 of the spring member 14 and thus sleeved on the piezoelectric actuator 15. A lens 20 is received in the lens barrel 17, and then the lens barrel 17 is screwed into the lens holder 16. The lens holder 16 is screwed into the positioning through hole 180 of the positioning frame 18, and presses the piezoelectric actuator 15. The piezoelectric actuator 15 tightly contacts the inner portion 142, and the inner portion 142 is pressed into the receiving through hole 130 by the piezoelectric actuator 15. The cover 19 is covered on the positioning frame 18 and fixed to the positioning plate 13. The lens barrel 17 is exposed via the opening 194. The camera module 100 is thus assembled.

In operation of the camera module 100, if the lens barrel 17 needs to move upwards, two driving voltages having a phase difference of ninety degrees are correspondingly applied to the oppositely polarized piezoelectric segments 158 to generate a counterclockwise travelling wave. The counterclockwise travelling wave is transferred to the protecting member 152, and a friction is generated between the protecting member 152 and the lens holder 16. As a result, the lens holder 16 rotates counterclockwise around a central axis of the positioning through hole 180, and thereby simultaneously moves gradually upwards along the second internal screw thread 182. The pressed inner portion 142 moves upwards accordingly, and applies a counterforce to the piezoelectric actuator 15 to maintain the tight contact between the protecting member 152 and the lens holder 16. As a result, the lens received in the lens barrel 17 moves upwards with the lens barrel 17 for focusing. In practice, the driving voltages should be high enough such that the friction between the protecting member 152 and the lens holder 16 can overcome the friction between the first external screw thread 162 and the second internal screw thread 182.

If the lens barrel 17 needs to move downwards, opposite driving voltages are applied to the piezoelectric member 150, and a clockwise travelling wave is generated accordingly. The lens holder 16 is driven to rotate clockwise, and thereby simultaneously moves gradually downwards relative to the positioning frame 18. Accordingly, the lens received in the lens barrel 17 moves downwards. The piezoelectric actuator 15 and the inner portion 142 are pressed by the lens holder 16 to correspondingly move downwards.

It should be understood that the spring member 14 can instead be an elastic ring, which is received in the positioning frame 18 and sandwiched between the lens holder 16 and the positioning plate 13.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A camera module comprising:
a positioning plate;
a positioning frame fixed to the positioning plate, the positioning frame defining a positioning through hole;
a spring member disposed on the positioning plate;
a lens holder received in the positioning through hole and threadedly and movably engaged with the positioning frame; and
a piezoelectric actuator sandwiched between the compressed spring member and the lens holder, the spring member being in a compressed state, the piezoelectric actuator being operable to drive the lens holder to rotate about a central axis of the positioning frame and thereby move along the central axis relative to the positioning frame.

2. The camera module of claim 1, wherein the spring member comprises an outer portion and an inner portion elastically connected to the outer portion, the outer portion being sandwiched between the positioning plate and the positioning frame, the inner portion pressing the piezoelectric actuator thereby maintaining tight contact between the piezoelectric actuator and the lens holder.

3. The camera module of claim 1, wherein the piezoelectric actuator comprises an annular piezoelectric member, which comprises a plurality of oppositely polarized piezoelectric segments arranged in a circle, the oppositely polarized piezoelectric segments being alternately connected to each other.

4. The camera module of claim 3, wherein the piezoelectric actuator further comprises two protecting members which sandwich the piezoelectric member therebetween.

5. The camera module of claim 3, wherein the piezoelectric actuator is annular, and is operable to generate a wave travelling in a circle around the piezoelectric actuator.

6. The camera module of claim 1, wherein the piezoelectric actuator is operable to drive the lens holder via frictional engagement between the piezoelectric actuator and the lens holder.

7. The camera module of claim 1, further comprising a lens barrel fixed to the lens holder and at least one lens received in the lens barrel.

8. The camera module of claim 7, further comprising a cover defining an opening, wherein the cover is fixed to the positioning plate and covers the positioning frame, with the lens barrel being exposed via the opening.

9. The camera module of claim 1, further comprising:
a substrate;
an image sensor fixed to the substrate; and
a receiving frame fixed to the substrate and surrounding the image sensor;
wherein the positioning plate is disposed on the receiving frame.

10. A camera module comprising:
a positioning frame defining a positioning through hole;
a lens holder rotatably and movably received in the positioning through hole by threaded engagement, the lens holder being operable to move along a central axis of the positioning frame when rotating about the central axis;
a piezoelectric actuator drivably contacting the lens holder, the piezoelectric actuator being operable to drive the lens holder to rotate about the central axis; and
a spring member connected to one side of the piezoelectric actuator that is opposite to the side contacting the lens holder and compressed by the piezoelectric actuator, the spring member structured and arranged to apply a counterforce to the piezoelectric actuator to maintain the drivable contact between the piezoelectric actuator and the lens holder.

11. The camera module of claim 10, wherein the piezoelectric actuator comprises an annular piezoelectric member, which comprises a plurality of oppositely polarized piezoelectric segments arranged in a circle, the oppositely polarized piezoelectric segments being alternately connected to each other.

12. The camera module of claim 11, wherein the piezoelectric actuator further comprises two protecting members which sandwich the piezoelectric member therebetween.

13. The camera module of claim 11, wherein the piezoelectric actuator is annular, and is operable to generate a wave travelling in a circle around the piezoelectric actuator.

14. The camera module of claim 10, wherein the piezoelectric actuator is operable to drive the lens holder via frictional engagement between the piezoelectric actuator and the lens holder.

15. The camera module of claim 10, further comprising a lens barrel fixed to the lens holder and at least one lens received in the lens barrel.

16. The camera module of claim 10, further comprising a positioning plate which the positioning frame is fixed to.

17. The camera module of claim 16, wherein the spring member comprises an outer portion and an inner portion elastically connected to the outer portion, the outer portion being sandwiched between the positioning plate and the positioning frame, the inner portion pressing the piezoelectric actuator thereby maintaining tight contact between the piezoelectric actuator and the lens holder.

18. The camera module of claim 16, further comprising a cover defining an opening, wherein the cover is fixed to the positioning plate and covers the positioning frame, with the lens barrel being exposed via the opening.

19. The camera module of claim 16, further comprising:
a substrate;
an image sensor fixed to the substrate; and
a receiving frame fixed to the substrate and surrounding the image sensor;
wherein the positioning plate is disposed on the receiving frame.

* * * * *